(12) United States Patent
Dierickx et al.

(10) Patent No.: US 9,582,800 B2
(45) Date of Patent: Feb. 28, 2017

(54) SYSTEM AND METHOD FOR PERMITTING A USER TO SUBMIT A PAYMENT ELECTRONICALLY

(71) Applicant: Panasonic Avionics Corporation, Lake Forest, CA (US)

(72) Inventors: Michael Dierickx, Temecula, CA (US); Kwok Liang Poo, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 448 days.

(21) Appl. No.: 14/214,133

(22) Filed: Mar. 14, 2014

(65) Prior Publication Data

US 2014/0279563 A1    Sep. 18, 2014

Related U.S. Application Data

(60) Provisional application No. 61/793,398, filed on Mar. 15, 2013.

(51) Int. Cl.
   *G06Q 20/38* (2012.01)
   *G06Q 20/32* (2012.01)
   (Continued)

(52) U.S. Cl.
   CPC ......... *G06Q 20/3829* (2013.01); *G06Q 20/02* (2013.01); *G06Q 20/202* (2013.01);
   (Continued)

(58) Field of Classification Search
   None
   See application file for complete search history.

(56) References Cited

U.S. PATENT DOCUMENTS 6,223,287 B1    4/2001  Douglas et al.
7,810,729 B2   10/2010  Morley, Jr.
(Continued)

OTHER PUBLICATIONS

European Patent Office, Extended European Search Report, Application No. EP 14 15 8544, Aug. 20, 2014, Munich, Germany.
(Continued)

*Primary Examiner* — Kristy A Haupt
(74) *Attorney, Agent, or Firm* — Brian Furrer

(57) ABSTRACT

A system and method for permitting a user to submit a payment electronically, which includes a network and an electronic device in communication. The electronic device is operated by the user to submit an electronic payment request. A first server in communication with the network receives the request and in response communicates an encryption key and process to the electronic device. The electronic device encrypts the financial information with the encryption key and process and communicates encrypted financial information to the first server. A second server is in communication with the first server at least some of the time via an Internet connection. If there is Internet connectivity, the first server communicates the encrypted financial information to the second server. If there is no Internet connectivity and the payment amount is less than a predefined amount, the first server communicates to the electronic device that the payment has been accepted.

20 Claims, 3 Drawing Sheets

(51) Int. Cl.
*G06Q 20/02* (2012.01)
*G06Q 20/34* (2012.01)
*G06Q 20/20* (2012.01)

(52) U.S. Cl.
CPC .......... *G06Q 20/325* (2013.01); *G06Q 20/34* (2013.01); *G06Q 20/38215* (2013.01)

(56) References Cited

U.S. PATENT DOCUMENTS

| | | |
|---|---|---|
| 8,326,282 B2 | 12/2012 | Margis |
| 2003/0182576 A1 | 9/2003 | Morlang et al. |
| 2004/0210519 A1* | 10/2004 | Oppenlander ......... G06Q 20/10 705/39 |
| 2005/0132407 A1* | 6/2005 | Boyer ................ B64D 11/0015 725/77 |
| 2010/0189089 A1 | 7/2010 | Lynch et al. |
| 2012/0072714 A1 | 3/2012 | Grandcolas et al. |
| 2012/0143770 A1* | 6/2012 | Pauker ................... G06Q 20/02 705/71 |
| 2012/0150710 A1* | 6/2012 | Eloff ...................... G06Q 40/00 705/35 |
| 2012/0324242 A1 | 12/2012 | Kirsch |
| 2013/0160060 A1 | 6/2013 | Margis |

OTHER PUBLICATIONS

European Patent Office, Summons to attend oral proceedings pursuant to Rule 115(1) EPC, Application EP 14158544.8-1958 / 2779062, Munich Germany.

Mozilla Support, Firefox Password manager instructions, dated Feb. 6, 2015.

\* cited by examiner

SYSTEM AND METHOD FOR PERMITTING A USER TO SUBMIT A PAYMENT ELECTRONICALLY

CROSS-REFERENCE TO RELATED APPLICATIONS

This application claims priority from U.S. Provisional Application No. 61/793,398, filed Mar. 15, 2013. Priority from the foregoing provisional application is expressly claimed and the disclosure thereof is incorporated herein by reference in its entirety and for all purposes.

TECHNICAL FIELD

The present invention relates generally to electronic commerce and in particular to electronically submitted payments in environments where there may be interruptions in online access for authorization of an electronic payment.

BACKGROUND

Travel frequently results in interruptions in online access. For example, online access during travel by ground transportation may be interrupted when passing through tunnels or past other signal obstructions. Electronic device usage on commercial passenger aircraft is typically restricted during takeoff and landings. Hence, it is possible that a passenger may be partway through completion of an online purchase, when flight crew commands all electronic devices to be turned off, interrupting an electronic payment request.

While Internet access is increasingly common during commercial passenger flights, online access during flight is still subject to interruptions. Transoceanic flights for instance, maintain Internet access via satellite. As an aircraft passes from one satellite coverage area to another, there is typically a transition period before online access can be re-established via the new satellite. Accordingly, a request for an electronic payment submitted during the transition period cannot be verified until online access is restored.

Some airlines provide online access via ground based cellular towers for overland flights. However, interruptions may still occur while traveling over remote areas lacking cellular coverage.

In addition, there may be weather interruptions. Rain or dense water vapor may attenuate signals, making reception and/or transmission impossible. Electrical charge buildup and discharge may create electromagnetic interference that also causes interruptions in online access. Lightning strikes may cause computing devices to reboot, fuses to burn out or breakers to trip, also causing interruptions in online access before a request for an electronic payment can be fully submitted.

The present invention addresses the effects of delayed authorization for an electronic payment request due to interruption in online access.

SUMMARY

In one aspect, an embodiment of a system is provided for permitting a user to submit a payment electronically. The system includes a network and an electronic device in communication with the network in which the electronic device is operated by the user to submit a request for submitting a payment electronically.

Further included is a first server in communication with the network. The first server receives the request. In response, the first server communicates an encryption key and process to the electronic device for encrypting financial information provided by the user via the electronic device. The electronic device encrypts the financial information with the encryption key and process and communicates encrypted financial information to the first server.

The system also includes a second server in communication with the first server at least some of the time via an Internet connection. If there is Internet connectivity, the first server communicates the encrypted financial information to the second server and if there is no Internet connectivity, the first server stores the encrypted financial information until there is Internet connectivity. If there is no Internet connectivity and the user has submitted a payment request that is below a predefined limit, the first server communicates to the electronic device that the payment request has been accepted. In this case, the requested product and/or service are provided to the user.

In further details, the financial information provided by the user includes credit and/or debit card information. In yet further details, the computer program instruction code is written in JAVASCRIPT (a trademark designating a programming language developed by Netscape Communications). In still more details, the encryption key is based upon an asymmetric key algorithm.

In another aspect, an embodiment of a method is provided for permitting a user to submit a payment electronically. The method includes placing an electronic device in communication with a network in which the electronic device is operated by the user to submit a request for submitting a payment electronically. The method includes using a first server to receive the request and in response communicate an encryption key and process to the electronic device for encrypting financial information provided by the user via the electronic device.

Additionally included is encrypting the financial information with the encryption key and process on the electronic device and communicating the encrypted financial information to the first server. The method includes checking to see if there is Internet connectivity and if there is Internet connectivity, communicating the encrypted financial information to a second server from the first server via the Internet. If there is no Internet connectivity, the method includes storing the encrypted financial information on the first server until there is Internet connectivity.

In further details, the method includes deleting the encrypted financial information after it has been communicated to the second server. In addition, the checking includes sending a communication to the electronic device if there is no Internet connectivity and the amount of the payment request is below a predefined limit. In this regard, the method includes providing a product or service to the user if there is no Internet connectivity and the amount of the payment request is below the predefined limit.

Other aspects, details, and advantages will become apparent from the following description, taken in conjunction with the accompanying drawings, illustrating by way of example preferred and alternative embodiments in accordance with the invention.

BRIEF DESCRIPTION OF THE DRAWINGS

The drawing figures are not necessarily to scale and do not represent every feature, but are diagrammatic to enable those of ordinary skill in the art to make and use the invention without undue experimentation and do not limit the scope of the claims. Embodiments in accordance with the invention and advantages will therefore be understood by those of ordinary skill in the art by reference to the detailed description below together with the following drawings figures, wherein:

DETAILED DESCRIPTION OF THE PREFERRED EMBODIMENTS

Figure 1:
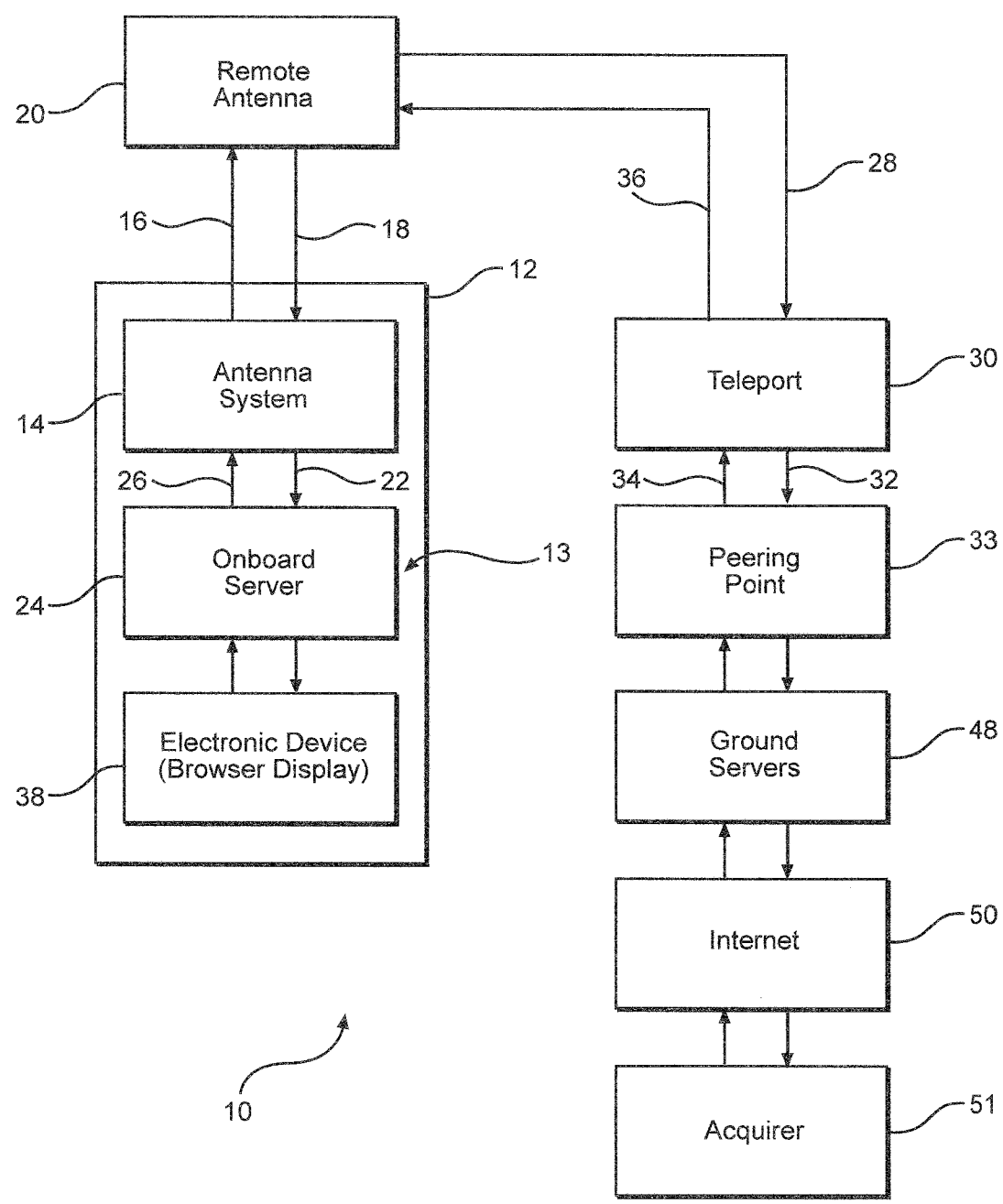
FIG. 1 is a schematic diagram of a preferred embodiment of a system in accordance with the present invention for a submitting a request for an electronic payment.

FIG. 1 illustrates a schematic diagram of a preferred embodiment of a system, indicated generally by reference numeral 10, in accordance with the invention for submitting a payment electronically. The system 10 is applicable for use on a vehicle 12, such as an aircraft, train, bus, ship or other type of vehicle. The system 10 provides advantages in situations where there are interruptions in online access, for instance when such a vehicle 12 passes through a tunnel or encounters some other kind of signal interruption. However, signal interruptions can occur even in stationary environments as well. Hence, the system 10 is not limited to a vehicle 12 and may be used in a building or other stationary environment.

For online access, i.e., establishing an Internet connection, the system 10 includes an antenna system 14 carried with the vehicle 12. The antenna system 12 is for receiving and transmitting signals 16 and 18 to a remote antenna 20, i.e., an antenna not carried with the vehicle 12. The remote antenna 20 may be an antenna on a tower or tall building or on a satellite.

Signals 18 from the remote antenna 20 are received by the antenna system 14 on the vehicle 12. The antenna system 14 on the vehicle 12 includes a modem, which demodulates the signals 18 from the remote antenna 20 and communicates demodulated signals 22 in accordance therewith to a first or onboard server 24. That is, a server 24 that is carried with the vehicle. The demodulated signals 22 may be communicated indirectly to the server 24 through a router, hub, or other computing or information processing device.

Conversely, the onboard server 24 provides demodulated signals 26 to the antenna system 14. The demodulated signals 26 may be communicated directly to the modem or indirectly, such as through a router, hub or other computing or information processing device, before reaching the modem. The modem modulates the signals 26 and communicates them to an antenna of the antenna system 14, in which modulated signals 16 in accordance with the demodulated signals 26 from the onboard server are transmitted.

Demodulated signals 16 transmitted by the antenna system 14 of the vehicle 12 are received by the remote antenna 20. In the case of a remote antenna 20 on a satellite, the satellite communicates corresponding signals 28 to a teleport 30 on the ground. The teleport 30 includes an antenna and modem. The antenna of the teleport 30 receives the signals 28 and communicates them to the modem of the teleport 30 for demodulation. Demodulated signals in accordance with the modulated signals 28 are thereafter communicated to an Internet service provider (ISP) for providing Internet connectivity.

Internet signals 34 are likewise communicated by the Internet service provider to the modem of the teleport 30 for modulation. Hence, modulated signals 36 in accordance with the Internet signals 34 are provided to the teleport antenna for transmission. The modulated signals 36 from the teleport antenna are received by the remote antenna 20. The remote antenna 20 communicates signals 18 in correspondence therewith, in which the signals 18 are received by the antenna system 14 of the vehicle 12. If the remote antenna 20 is ground based, for example mounted on a tower or tall building instead of on a satellite, a modem may be disposed in the structure supporting the remote antenna 20.

A user on the vehicle 12 uses a web browser on an electronic device 38 to communicate with the sever 24 onboard the vehicle 12. In particular, the onboard server 24, electronic device 38 and other computing or information processing hardware are interconnected for communication between one another according to known methods and form a network indicated generally by reference numeral 13 in FIG. 1. Preferably, the communication is in accordance with known protocols, such as Ethernet and Wi-Fi, i.e., protocols and/or technology based on the Institute of Electrical and Electronics Engineers (IEEE) 802.3 and 802.11 standards.

The electronic device 38 may be for example, a personal electronic device (PED), such as a smart phone, tablet computer, laptop, or other computing or information processing device capable of running a web browser. It may also be a smart monitor installed on a passenger seatback or bulkhead on the vehicle 12, in which a web browser is running. The communication with the onboard server 14 may be wired or wireless. In general, the electronic device 38 does not communicate directly to the onboard server 14, and instead the communication is via the network 13. For example, the communication from the electronic device 38 is transferred through a router, hub, wireless access point (WAP) or other computing or information processing hardware and then to the onboard server 24.

A user may be use the browser to submit an electronic payment. For example, the user may wish to purchase a physical item, such as a food or beverage item, or a virtual item, such as a book in electronic format. The onboard server 24 executes code which waits or monitors for when the user enters a request to submit a payment as indicated in block 40 of FIG. 2.

When the onboard server 24 receives a user purchase request in block 40, the code executed by the onboard server 24 pushes or communicates a public key and encryption process to the electronic device 38 as indicated by block 42. Preferably, the public key and encryption process 42 is pushed or communicated in the form of a computer executable process that runs locally in the browser on the electronic device 38, rather than on the onboard server 24. Such type of computer executable process includes for example, code written in JAVASCRIPT, which is a trademark designating a programming language developed by Netscape Communications.

An advantage of using code that runs locally in the browser on the electronic device 38 is that sensitive data, such as a user's financial information, may be encrypted before it is transmitted. Encryption prior to transmission or communication makes it less likely that sensitive information will be compromised or captured by unauthorized parties. Programming languages other than JAVASCRIPT may be used that have the feature of running locally in a client browser, i.e., the electronic device 38, rather than on the server 24.

Instead of JAVASCRIPT, for example, it may be an application developed in C or a variant thereof, e.g., C++, and downloaded and installed on the electronic device 38. That is, what is commonly referred to as an "app" as is commonly installed under IOS in mobile computing devices sold by Apple Inc. In this regard, IOS is a trademark of Cisco Systems, Inc. and used under license by Apple Inc. for the name of an operating system developed by Apple for mobile devices.

As yet another alternative for JAVASCRIPT, it may be an application developed in JAVA (a trademark owned by Oracle America, Inc.) and downloaded and installed on the electronic device 38. More particularly, ANDROID is a trademark of Google, Inc. and designates a Linux-based open source operating system designed for touch screen mobile devices.

The public key is based upon an asymmetric key algorithm, preferably of a known public domain type, such as that developed by Ron Revist, Adi Shamir and Leonard Adleman, known as RSA. The key size is preferably at least 2048 bits or larger for ensuring adequate security. Demonstration examples of the encryption process written in JAVASCRIPT have been made publicly available by several organizations and in the interest of brevity are not further explained. Specifically, implementation thereof would be understood by a person of ordinary skill in the art without requiring the use of undue experimentation.

Figure 2:
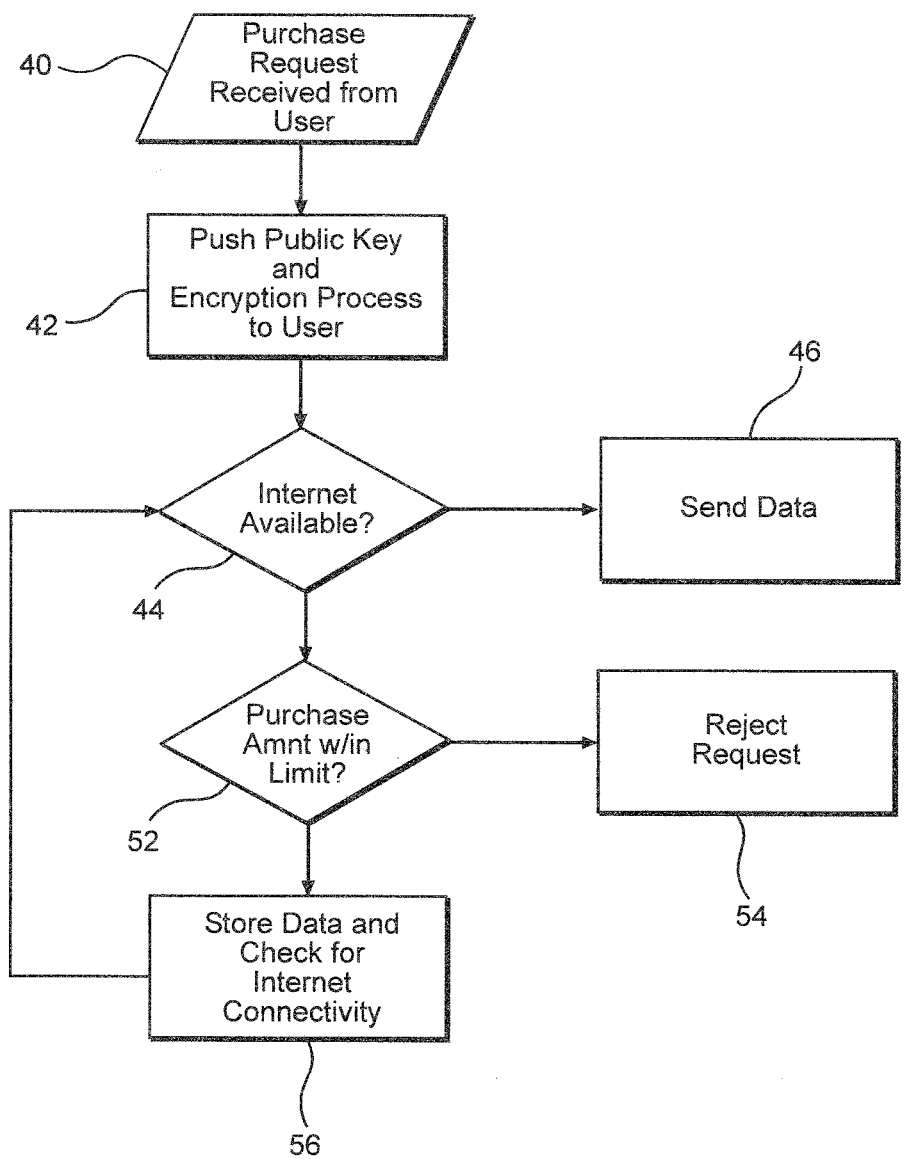
FIG. 2 is a schematic diagram of a method or process used by the system of FIG. 1.

After entry of financial information by the user and encryption thereof, the onboard server 24 checks for Internet connectivity in block 44 of FIG. 2. If there is Internet connectivity, the encrypted data is sent or communicated for payment authorization as indicated by block 46 in FIG. 2. For example, the encrypted financial information may be sent to a bank or other organization for payment authorization in which the bank or organization issued a credit or debit card that the user has selected to make payment with. Alternatively, it may be sent or communicated to an online merchant, which handles payment authorization.

Payment authorization is received via one or more second or ground servers 48 as indicated in FIG. 1. Generally, the ground server or servers 48 communicate via the Internet 50 with a banking institution or processor termed hereinafter an acquirer 51. The acquirer 51 provides a public key for encrypting information communicated thereto. In particular, the public key is obtained by the onboard server 24 and stored thereon in case of an interruption in Internet connectivity. Hence, even in the event of an interruption in online access, the public key may be communicated to a user of an electronic device 38 by the onboard server for encrypting sensitive information. Upon receipt of encrypted information from a user, a private key is used by the acquirer 51 to decrypt the information and verify the financial information provided by the user, and if all is in order, authorize payment.

Returning to FIG. 2, if Internet connectivity is not available after a purchase request has been received from a user, the code executed by the onboard server 24 checks the purchase amount in decision block 52. If the purchase amount is not within a predefined limit, i.e., the amount is greater than a predefined maximum, the purchase request is rejected as indicated in block 54. Preferably, a message is communicated by the onboard server 24 to the electronic device 38 for display on the browser thereof, that Internet connectivity is not presently available and to try again later. In alternative embodiments, the processing may monitor for when Internet connectivity has been restored and send a message to the user when Internet connectivity is available.

If the purchase amount is within a predefined limit, i.e., no more than a predetermined maximum amount, the purchase request is accepted. In addition, the encrypted data is stored as indicated in block 54 and thereafter periodically checks for Internet connectivity. When Internet connectivity is available, the data is sent as in block 46. Alternatively, the data may be stored in memory, i.e., RAM or on media and the processing returns to decision block 44 to check for Internet connectivity and the process repeated until the Internet is accessible from the vehicle 12.

An advantage of this process is that a user may make a cashless purchase on the vehicle 12 even in the absence of Internet connectively so long as the purchase is within a certain limit. For example, the user may wish to purchase a beverage, for example an alcoholic beverage or food item, immediately, rather than being required to wait for Internet connectivity. If the purchase price for the beverage is within the predefined limit, the risk is kept within an acceptable amount should it be discovered upon connection to the Internet that the user's credit or debit card is expired or unusable for one reason or another. In alternative preferred embodiments, an outstanding total may be kept when there is no Internet connectivity so that a user may make multiple purchases so long as the total combined amount of the purchases is below a predefined maximum amount.

The acquirer 51 is typically selected by the transportation carrier for the vehicle 12. If the vehicle 12 is an aircraft, the carrier is most likely an airline. The system 10 may used on other vehicles as well, for example, on ships, busses, or trains, and thus may be a passenger railway carrier or other type of transportation carrier.

The system 10 may be a subset of an entertainment system provided on a vehicle. For example, the electronic device 38 may be a smart monitor provided on seat backs or bulkheads of the vehicle 12 to reproduce video and audio for passengers, play games, provide online shopping and other activities. For online shopping for products and services available on the vehicle 12, the onboard server 24 normally serves web pages for this on the electronic device 38. Typically, the web pages are displayed in the browser of the electronic device 38.

Frequently however, a passenger will use his or her own personal electronic device 38 that is carried onboard with the passenger, such as a smart phone, laptop, eBook reader, tablet computer, or other information processing device having a browser. Most commonly, these devices connect wirelessly though known protocols, such as Wi-Fi, as described previously. In particular, at least one wireless access point (WAP) is provided on the vehicle 12 for passengers to connect to with personal electronic devices 38 carried onboard by the passengers. Vehicle personnel may carry electronic devices 38 with wireless connectivity, such as tablets or smart phones, for taking orders from passengers. Alternatively, wired connections may be provided for passengers, such as Ethernet ports (connection ports in accordance with IEEE 802.3 technologies). However, wireless connections are preferred due to greater convenience and to avoid the necessity for cables and wiring, which could pose obstacles to passenger and crew movement about a passenger compartment or cabin.

Electronic devices 38 mounted on the vehicle 12, for example mounted to seatbacks and bulkheads, may also connect wirelessly through one or more wireless access points. Notwithstanding, electronic devices 38 mounted on the vehicle are usually wired connections for more reliable connectivity and to comply with applicable laws and regulations governing the carrying of passengers, especially with regard to passenger aircraft during takeoff and landing. Permanently mounted electronic devices 38 have an advantage in that cabling and wiring may be routed in locations that are out of the way and thus does not create obstacles or hazards.

Returning to FIG. 1, the teleport 30 will frequently communicate to the ground servers or server 48 via a centralized peering point 33 where all communications for all teleports 30 in a region communicate to. In alternative embodiments, the teleport 30 may communicate directly to a ground server or servers 48.

An advantage of the invention is that sensitive information entered by the user is encrypted on the electronic device 38 before it is communicated. Moreover, the encryption uses a public key provided by a third party. Hence, sensitive user information is encrypted in a manner that cannot be decrypted on the vehicle 12 and read because there is no access to the private key. Only the acquirer 51 has access to the private key, which is necessary to decrypt the information provided by the user.

After the encrypted financial information has been sent to the acquirer 51, the encrypted financial information is preferably deleted, using a known method that prevents recovery of the information from storage media. In an alternative embodiment, the encrypted information may be retained for the duration of that user's trip on the vehicle so that the user is not required to re-input the information for a subsequent purchase. In yet another alternative embodiment, the user is provided the option of whether the user's encrypted financial information will be stored or not, according to the user's preference.

Submission of electronic payments may be intentionally delayed in some situations. Provision of Internet access to passengers by a transportation carrier via a satellite and/or cellular methods can be expensive. The transportation carrier may opt to reduce satellite and/or cellular communication charges by not submitting electronic payments for payment authorization until a certain limit or ceiling has been reached.

In this regard, there are competing goals. One goal is to maintain the risk of nonpayment for the transportation carrier within an acceptable level should payment authorization be refused (declined). Minimization of risk is in competition with the goal for reducing satellite and/or cellular communication expenses. Further, there is the goal of minimizing inconvenience to the user/passenger, which is also in competition with the goal of minimizing financial risk. The overall goal is generally to maximize profit for the transportation carrier by striking the appropriate balance between competing goals.

Figure 3:
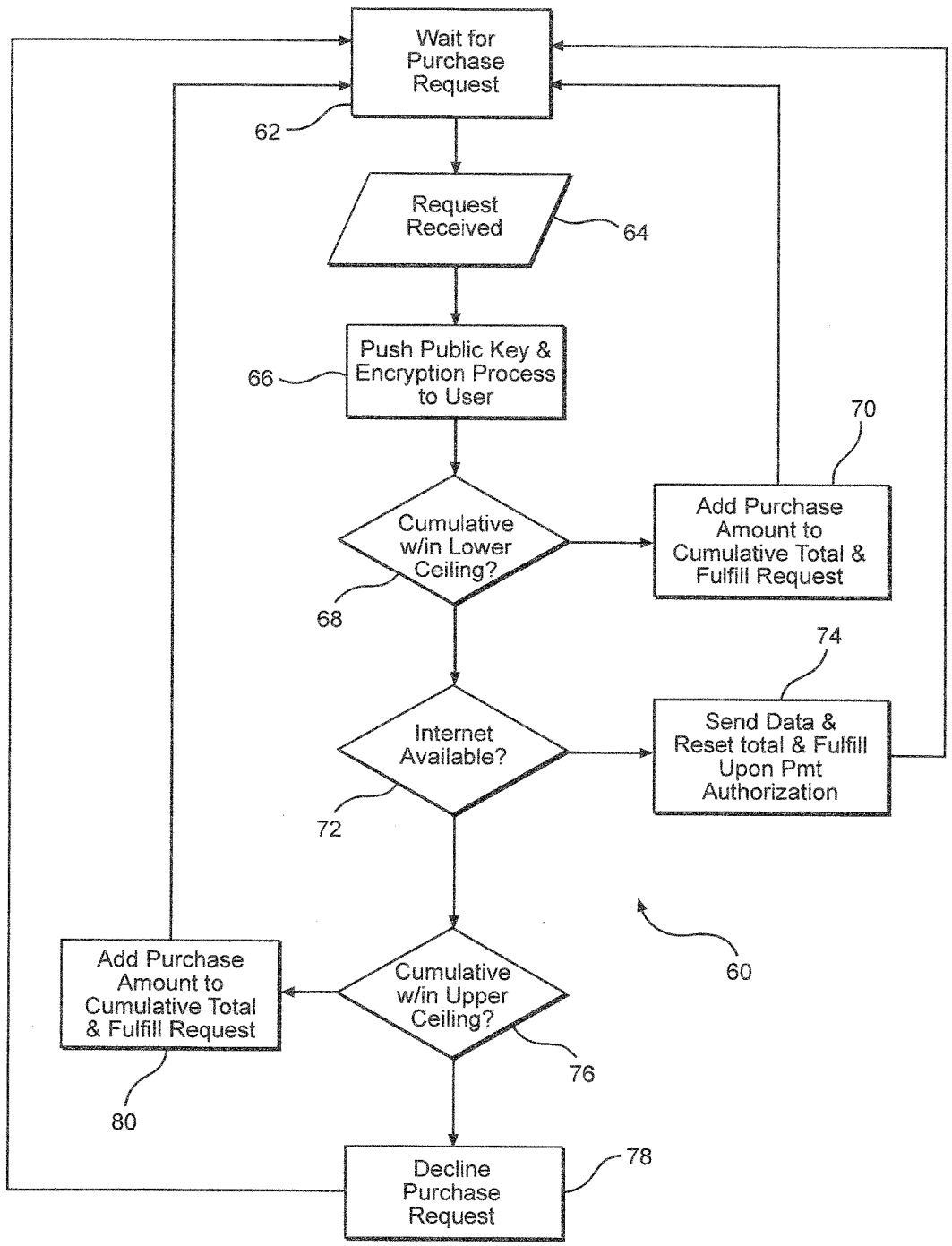
FIG. 3 is a schematic diagram of another method or process used by the system of FIG. 1.

A preferred embodiment of a method or process 60 in accordance with the foregoing is illustrated in FIG. 3. The process 60 is intended to be implemented in software code executed on the onboard server 24. The process 60 waits for a purchase request from a user as indicated in block 62. Upon receipt of a request in block 64, the process 60 provides the user with a public encryption key and encryption process in block 66. The public encryption key and encryption process is as explained before, for example in accordance with block 42 of FIG. 2.

Referring to FIG. 3, the system 60 performs a check to determine if the cumulative total for that user's credit card is within a predefined lower maximum or ceiling amount in decision block 68. If the answer is in the affirmative, the process 60 proceeds to block 70, in which the purchase amount is added to the cumulative total and the purchase request is fulfilled. Fulfillment may involve sending a message to crew personnel to supply a beverage or food item to the user/passenger or may involve providing a virtual item to the user, such as an eBook or streaming a video for the user. The process 60 then returns to block 62 and waits for another purchase request.

If the decision was negative in decision block 68, the process 60 proceeds to decision block 72 and checks if there is access to the Internet (Internet connectivity). If there is Internet connectivity, the process 60 sends the data for payment authorization in block 74. In addition, the cumulative total is reset to zero upon authorization of payment for that credit card and the request is fulfilled as described previously in connection with the processing in block 70. From there, the process 60 returns to block 62 and waits for another payment request.

If it is determined that access to the Internet is not available in decision block 72 (no Internet connectivity), the process 60 inquires in decision block 76 whether the cumulative total is within a predefined upper maximum or ceiling. If not, the purchase request is declined in block 78 and the process 60 thereafter waits in block 62 for another purchase request. The processing in block 78 may provide a message to the user to attempt a lower purchase amount or communicate other information helpful to the user.

If the cumulative total is within the predefined upper ceiling in decision block 76, the process 60 adds the purchase amount to the cumulative total and fulfills the request in block 80. The request is fulfilled as described earlier, such as in the processing in blocks 70 or 74. Thereafter, the process 60 returns to block 62 and waits for another purchase request.

The embodiments described herein may also include processing to determine a type of card that the user is attempting to make payment with and perform some validity checks. For example, the encryption process pushed to the electronic device 38 may check the numbers for being within a certain range. If the electronic device 39 includes a magnetic strip reader, other information is available as well such as indicated in the following table for attempting to do some validity checking:

| Card Type ID | Card Type Name | Card Class | Card Number Length | Low Range | High Range |
|---|---|---|---|---|---|
| 6 | MASTERCARD | credit | 16 | 510000 | 559999 |
| 7 | VISA | credit | 16 | 400000 | 499999 |
| 5 | JCB | credit | 16 | 352800 | 358999 |
| 1 | AMEX | credit | 15 | 340000 | 349999 |
| 1 | AMEX | credit | 15 | 370000 | 379999 |
| 7 | DINER | credit | 14 | 300000 | 305999 |
| 7 | DINER | credit | 14 | 380000 | 389999 |
| 8 | DISCOVER | credit | 16 | 601100 | 601199 |
| 8 | DISCOVER | credit | 16 | 622126 | 622925 |
| 8 | DISCOVER | credit | 16 | 644000 | 649999 |
| 8 | DISCOVER | credit | 16 | 650000 | 659999 |
| 100 | CREW CARD | crew | 16 | 0 | 999999 |

The code for receiving data from a magnetic card strip reader, sometimes called a magswipe card reader, is preferably an executable developed with the C programming language or a variant thereof, e.g., C++, and executed by the electronic device 38. The code for the onboard server 24 is also preferably an executable developed with the C programming language or variant thereof. JAVASCRIPT is used for communication between the onboard server 24 and a browser on an electronic device 38 for the ability to push or communicate an encryption key and code and from the server 24 in which the code is executed on the electronic device 38. This enables sensitive information to be encrypted on the electronic device 28 before it is communicated therefrom. Other programming languages now or later developed may be used that have this feature instead of JAVASCRIPT.

Various changes and modifications can be made to the described embodiments without departing from the spirit and scope of the invention as will be recognized by those of ordinary skill in the art. For example, the cumulative total may be per user or per seat rather than per card for additionally limiting financial risk.

In another example, a key size of other than 2048 bits may be used. As more powerful computing and information processing devices become available, preferably larger key sizes are used for greater security. The financial information could comprise bank information for directly charging a user's bank account rather than through a credit or debit card. Moreover, the information could comprise data for payment by PAYPAL, which is a registered trademark of PayPal, Inc., or other or later developed payment services. Encryption algorithms other than RSA could be employed. The computer program instruction code could be other than JAVASCRIPT for pushing an encryption key and process via a browser to an electronic device 38 from a server 24.

Different processing can be performed or rearranged for the first or onboard server 24. For example, instead of initially checking to determine if there is Internet connectivity, the processing of FIG. 2 could initially check to determine if the purchase amount is within a predetermined limit and if so provide the requested item or service. Thereafter the processing could check for Internet connectivity and reject the request if there is no Internet access. If there is Internet connectivity, the data is sent and if the product or service has not already been provided, the product or service is provided once payment authorization has been received.

While the above-described embodiments are intended for use on a vehicle, as noted it could also be used in a stationary environment. Since changes can be made as described, the present examples and embodiments are to be considered as illustrative and not restrictive and the invention is not to be limited to the details given herein, but may be modified within the scope and equivalence of the appended claims.

The invention claimed is:

1. A system for permitting a user to submit a payment electronically, the system comprising:
    a network and an electronic device in communication with the network in which the electronic device is operated by the user to submit a request for submitting a payment electronically;
    a first server in communication with the network in which the first server receives the request and in response communicates an encryption key and process to the electronic device for encrypting financial information provided by the user via the electronic device in which the electronic device encrypts the financial information with the encryption key and process and communicates encrypted financial information to the first server; and
    a second server in communication with the first server at least some of the time via an Internet connection in which if there is Internet connectivity, the first server communicates the encrypted financial information to the second server and if there is no Internet connectivity, the first server stores the encrypted financial information until there is Internet connectivity;
    wherein the first server maintains a cumulative total for payment requests submitted by the user and if the user has submitted a payment request that does not cause the cumulative total to exceed a predefined lower maximum, the payment request is accepted and the payment amount is added to the cumulative total, and if the payment request does cause the cumulative total to exceed the predefined lower maximum, the first server checks for Internet connectivity, and if there is Internet connectivity, the first server sends data to the second server for payment authorization, and after receiving payment authorization, the first server resets the cumulative total to zero.

2. The system of claim 1, wherein the financial information provided by the user includes credit card information.

3. The system of claim 1, wherein the process is computer program instruction code written in JAVASCRIPT.

4. The system of claim 1, wherein the encryption key is based upon an asymmetric key algorithm.

5. The system of claim 1, wherein the first server deletes the encrypted financial information after it has been communicated to the second server.

6. The system of claim 1, wherein if there is no Internet connectivity and the user has submitted a payment request that is below a predefined upper maximum, the first server communicates to the electronic device that the payment request has been accepted, and adds the amount of the payment request to the cumulative total.

7. A method for permitting a user to submit a payment electronically, the method comprising:
    placing an electronic device in communication with a network in which the electronic device is operated by the user to submit a request for submitting a payment electronically;
    using a first server to receive the request and in response communicate an encryption key and process to the electronic device for encrypting financial information provided by the user via the electronic device;
    encrypting the financial information with the encryption key and process on the electronic device and communicating the encrypted financial information to the first server;
    checking to see if there is Internet connectivity and if there is Internet connectivity, communicating the encrypted financial information to a second server from the first server via the Internet, and if there is no Internet connectivity, storing the encrypted financial information on the first server until there is Internet connectivity;
    maintaining with the first server a cumulative total for payment requests submitted by the user and if the user has submitted a payment request that does not cause the cumulative total to exceed a predefined lower maximum, accepting the payment request and adding the payment amount to the cumulative total; and
    if the payment request does cause the cumulative total to exceed the predefined lower maximum, checking for Internet connectivity with the first server, and if there is Internet connectivity, sending data from the first server to the second server for payment authorization, and after receiving payment authorization, resetting the cumulative total to zero.

8. The method of claim 7, further comprising deleting the encrypted financial information after it has been communicated to the second server.

9. The method of claim 7, wherein said checking includes sending a communication to the electronic device if there is no Internet connectivity and the amount of the payment request is below a predefined limit.

10. The method of claim 9, further comprising providing a product or service to the user if there is no Internet connectivity and the amount of the payment request is below the predefined limit.

11. The method of claim 7, wherein the process comprises computer instruction steps written in JAVASCRIPT.

12. The method of claim 7, wherein the encryption key is based upon asymmetric key algorithm.

13. The method of claim 7, wherein the financial information provided by the user includes credit card information.

14. A system for permitting a user to submit a payment electronically, the system comprising:
   a network and an electronic device in communication with the network in which the electronic device is operated by the user to submit a request for submitting a payment electronically;
   a first server in communication with the network in which the server receives the request and in response communicates an encryption key and process to the electronic device for encrypting financial information provided by the user via the electronic device in which the electronic device encrypts the financial information with the encryption key and process and communicates encrypted financial information to the first server; and
   a second server in communication with the first server at least some of the time via an Internet connection in which if there is Internet connectivity, the first server communicates the encrypted financial information to the second server and if there is no Internet connectivity and the payment amount is less than a predefined amount, the first server communicates to the electronic device that the payment has been accepted;
   wherein the first server maintains a cumulative total for payment requests submitted by the user and if the user has submitted a payment request that does not cause the cumulative total to exceed a predefined lower maximum, the payment request is accepted and the payment amount is added to the cumulative total, and if the payment request does cause the cumulative total to exceed the predefined lower maximum, the first server checks for Internet connectivity, and if there is Internet connectivity, the first server sends data to the second server for payment authorization, and after receiving payment authorization, the first server resets the cumulative total to zero and deletes the encrypted financial information.

15. The system of claim 14, wherein the encryption process runs in a web browser in the electronic device.

16. The system of claim 14, wherein the encryption key is a public key obtained from the second server.

17. The system of claim 16, wherein the encryption key is based upon an asymmetric key algorithm.

18. The system of claim 16, wherein the first server communicates the encrypted financial information to the second server if there is Internet connectivity and if there is no Internet connectivity, the first server stores the encrypted financial information until there is Internet connectivity and then transmits the encrypted financial information to the second server.

19. The system of claim 18, wherein the first server deletes the encrypted financial information after it has been communicated to the second server.

20. The system of claim 18, wherein the process is a computer program instruction code written in JAVASCRIPT.

* * * * *